(12) United States Patent
Fujii et al.

(10) Patent No.: US 10,158,113 B2
(45) Date of Patent: Dec. 18, 2018

(54) VEHICLE BATTERY UNIT AND HARNESS HOLDER

(71) Applicant: HONDA MOTOR CO., LTD., Tokyo (JP)

(72) Inventors: Daisuke Fujii, Wako (JP); Daijiro Takizawa, Wako (JP); Masashi Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 14/920,878

(22) Filed: Oct. 23, 2015

(65) Prior Publication Data

US 2016/0141586 A1 May 19, 2016

(30) Foreign Application Priority Data

Nov. 18, 2014 (JP) .................. 2014-233489

(51) Int. Cl.
*H01M 2/10* (2006.01)
*H01M 2/20* (2006.01)
*B60R 16/02* (2006.01)

(52) U.S. Cl.
CPC ......... *H01M 2/206* (2013.01); *B60R 16/0215* (2013.01); *H01M 2/1077* (2013.01); *H01M 2220/20* (2013.01)

(58) Field of Classification Search
CPC ........ H01M 2/206; H01M 2/202; H01M 2/24; H01M 2/1077; H01M 2/1083; H01M 2/1072; H01M 2220/20; B60K 1/04; B60R 16/0215

See application file for complete search history.

(56) References Cited

U.S. PATENT DOCUMENTS

2007/0259263 A1* 11/2007 Shibuya ................ H01M 2/105
429/186
2011/0300427 A1 12/2011 Iwasa et al.
(Continued)

FOREIGN PATENT DOCUMENTS

CN 103563123 2/2014
JP 10-174257 6/1998
(Continued)

OTHER PUBLICATIONS

Chinese Office Action for corresponding CN Application No. 201510673712.4 dated Sep. 4, 2017 (w/ English machine translation).

(Continued)

*Primary Examiner* — Raymond Alejandro
(74) *Attorney, Agent, or Firm* — Mori & Ward, LLP

(57) ABSTRACT

A vehicle battery unit includes at least one first battery, at least one second battery, and a harness. The at least one first battery has a first battery connector. The at least one second battery has a second battery connector. A harness has harness connectors connected to the first battery connector and second battery connector. The harness holds the harness in such a manner that connecting portions of the harness connectors are directed toward a direction substantially perpendicular to a battery arranging direction in which the at least one first battery and the at least one second battery are arranged.

22 Claims, 7 Drawing Sheets

(56) References Cited

U.S. PATENT DOCUMENTS

| | | | | |
|---|---|---|---|---|
| 2014/0284125 A1* | 9/2014 | Katayama | ................ | B60K 1/04 |
| | | | | 180/68.5 |
| 2014/0363723 A1* | 12/2014 | Imai | ..................... | H01M 2/206 |
| | | | | 429/121 |
| 2015/0086844 A1* | 3/2015 | Masuda | ................ | H01G 11/10 |
| | | | | 429/158 |

FOREIGN PATENT DOCUMENTS

| JP | 2012-243449 | 12/2012 |
|---|---|---|
| JP | 2013-143265 | 7/2013 |
| WO | WO 2010/098418 | 9/2010 |
| WO | WO 2014/156580 | 10/2014 |

OTHER PUBLICATIONS

Japanese Office Action for corresponding JP Application No. 2014-233489, dated Dec. 6, 2016 (w/ English machine translation).

\* cited by examiner

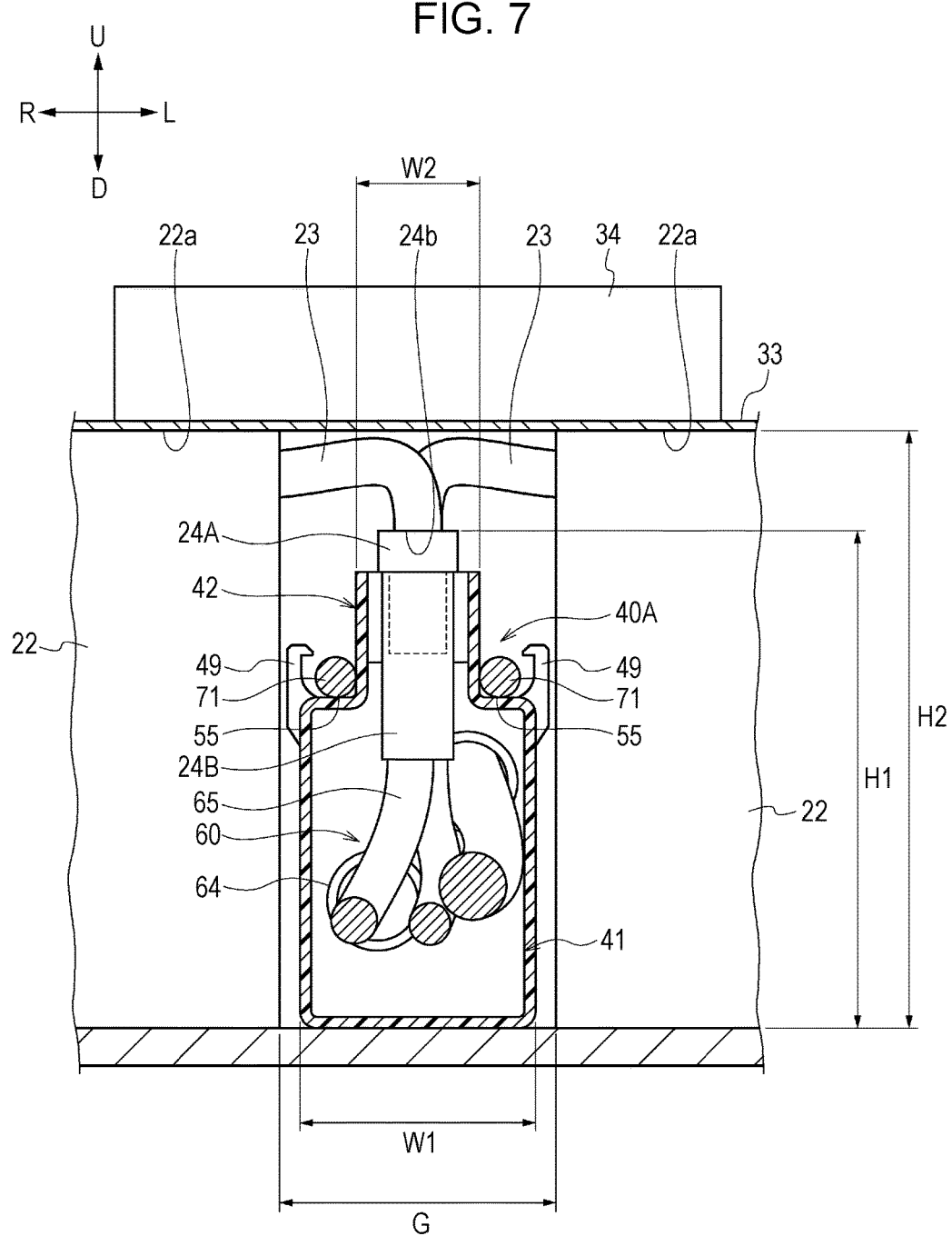

VEHICLE BATTERY UNIT AND HARNESS HOLDER

CROSS REFERENCES TO RELATED APPLICATIONS

The present application claims priority under 35 U.S.C. § 119 to Japanese Patent Application No. 2014-233489, filed Nov. 18, 2014, entitled "Vehicle Battery Unit And Harness Holder." The contents of this application are incorporated herein by reference in their entirety.

BACKGROUND

1. Field

The present disclosure relates to a vehicle battery unit and a harness holder.

2. Description of the Related Art

Hybrid vehicles, electric vehicles, or other electrically driven vehicles are mounted with high-voltage batteries as driving sources for the electric motors. The high-voltage batteries have sensors for detecting their voltage. A signal indicating the battery voltage detected by the sensors is sent to a control unit via a harness (hereinafter referred to as "VHB harness") that provides a connection between the batteries and the control unit. Due to its analog circuitry, the VHB harness causes an error in battery voltage detected in the control unit side, depending on wire type, wire diameter, ambient temperature, or the state of mechanical connection with the sensors. Typically, thinner wire conductor, longer wire, greater changes in temperature, or greater number of mechanical connections tends to result in a larger error in battery voltage.

On the contrary, the control unit has a margin for threshold for detecting battery over-charging/over-discharging to allow for an error in battery voltage. In other words, a higher voltage detection accuracy for high-voltage batteries results in a smaller margin for battery control threshold, which leads to an improvement in vehicle energy efficiency. For this reason, it is desirable that the VHB harness be as thick and short as possible with smaller changes in temperature and fewer harness joints, while meeting requirements for restrictions on vehicle weight and interior space as well as assemblability.

International Publication No. 2010/098418 discloses a battery mounting structure in which a battery unit and a connection control unit for controlling electrical connections for the battery unit are disposed under a vehicle floor panel. The battery unit has two battery groups that are disposed with a space therebetween. The connection control unit is disposed inside the space, whereby the disposition of the connection control unit is maximized and harness length is minimized.

SUMMARY

According to a first aspect of the present invention, a vehicle battery unit includes at least one battery pair. The at least one battery pair has two battery. Each of the two batteries has a battery connector. The two batteries are disposed so as to oppose each other with a space therebetween. A harness having two harness connectors connected to the battery connectors and being housed in a harness holder is disposed in the space. The harness holder holds the harness in such a manner that connecting portions of the two harness connectors face a direction perpendicular to a direction in which the two batteries are disposed.

According to a second aspect of the present invention, a harness holder houses a harness disposed between two batteries. The two batteries are disposed so as to be opposed to each other with a space therebetween. The harness is held in such a manner that connecting portions of two harness connectors connected to battery connectors extending from the two batteries face a direction perpendicular to a direction in which the two batteries are disposed.

According to a third aspect of the present invention, a vehicle battery unit includes at least one first battery, at least one second battery, and a harness. The at least one first battery has a first battery connector. The at least one second battery has a second battery connector. The at least one second battery is disposed opposite to the at least one first battery with a space therebetween. The harness is provided in a harness holder. The harness has harness connectors connected to the first battery connector and second battery connector. The harness holder is disposed in the space. The harness holds the harness in such a manner that connecting portions of the harness connectors are directed toward a direction substantially perpendicular to a battery arranging direction in which the at least one first battery and the at least one second battery are arranged.

According to a fourth aspect of the present invention, a harness holder includes a harness housing. A harness is disposed in a space provided between a first battery and a second battery disposed opposite to the first battery. The harness housing holds a harness in such a manner that connecting portions of harness connectors of the harness connected to battery connectors which extend from the first battery and the second battery are directed toward a direction substantially perpendicular to a battery arranging direction in which the first battery and the second battery are arranged.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a cross-sectional view taken along line VII-VII of FIG. 6.

DESCRIPTION OF THE PREFERRED EMBODIMENTS

Figure 1:
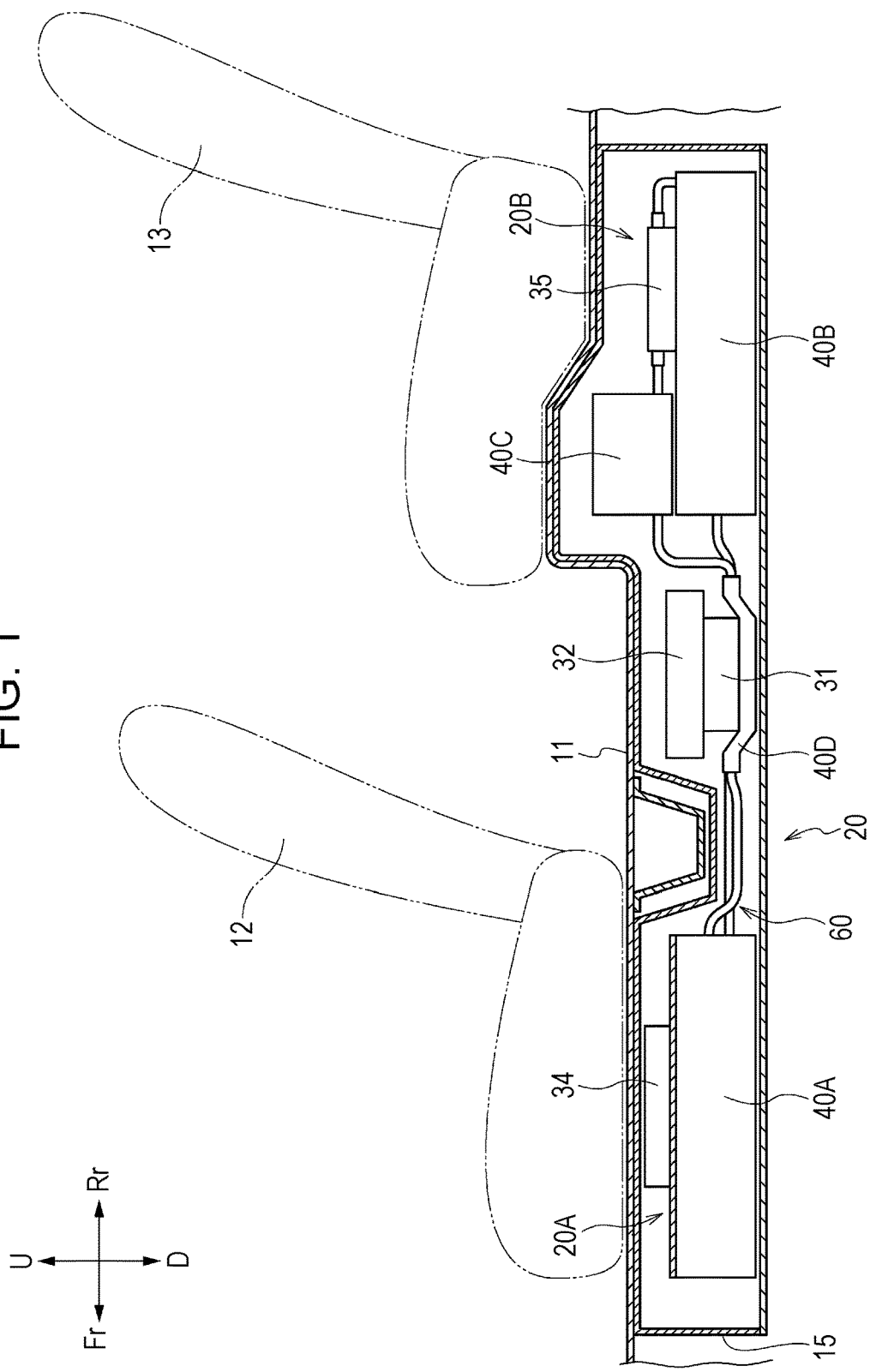
FIG. 1 is a longitudinal cross-sectional view showing part of a vehicle mounted with a vehicle battery unit according to an embodiment of the present application.

The embodiments will now be described with reference to the accompanying drawings, wherein like reference numerals designate corresponding or identical elements throughout the various drawings.

An embodiment of the present application will be described below with reference to the attached drawings. In the following descriptions, reference to "vehicle front (Fr)", "vehicle rear (Rr)", "left (L)", "right (R)", "upside (U)", or "downside (D)" is relative to a driver's position.

FIG. 1 is a longitudinal cross-sectional view showing part of a vehicle mounted with a vehicle battery unit according to an embodiment of the present application. As shown in FIG. 1, a vehicle battery unit 20 according to this embodiment, together with ancillary devices, is housed in a casing 15 and is disposed under a floor panel 11 of the vehicle. The vehicle battery unit 20 includes a first battery module 20A disposed under front seats 12 of the vehicle and a second battery module 20B disposed under rear seats 13 of the vehicle.

Figure 2:
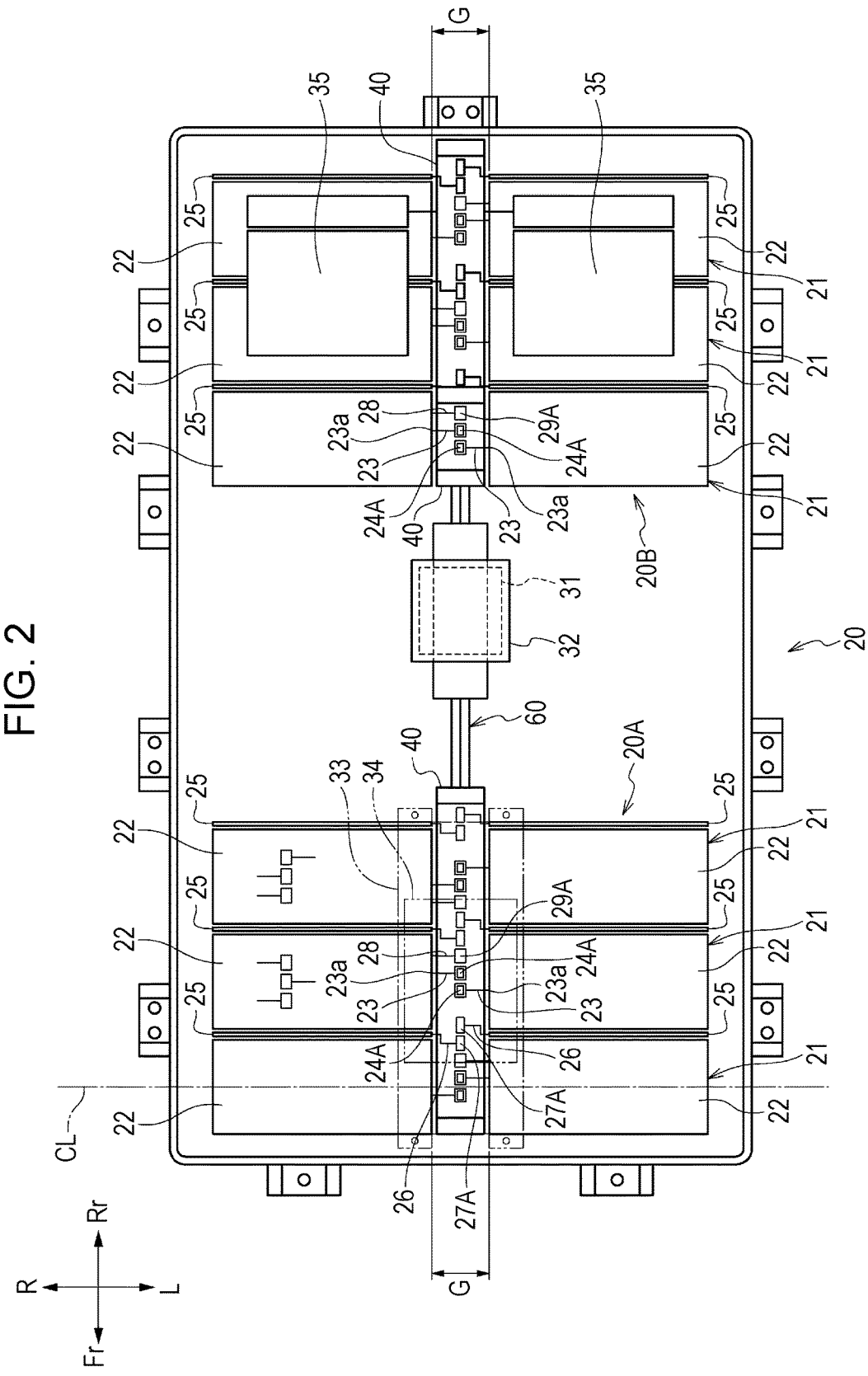
FIG. 2 is a plan view showing an internal configuration of a vehicle battery unit according to an embodiment.
Figure 3:
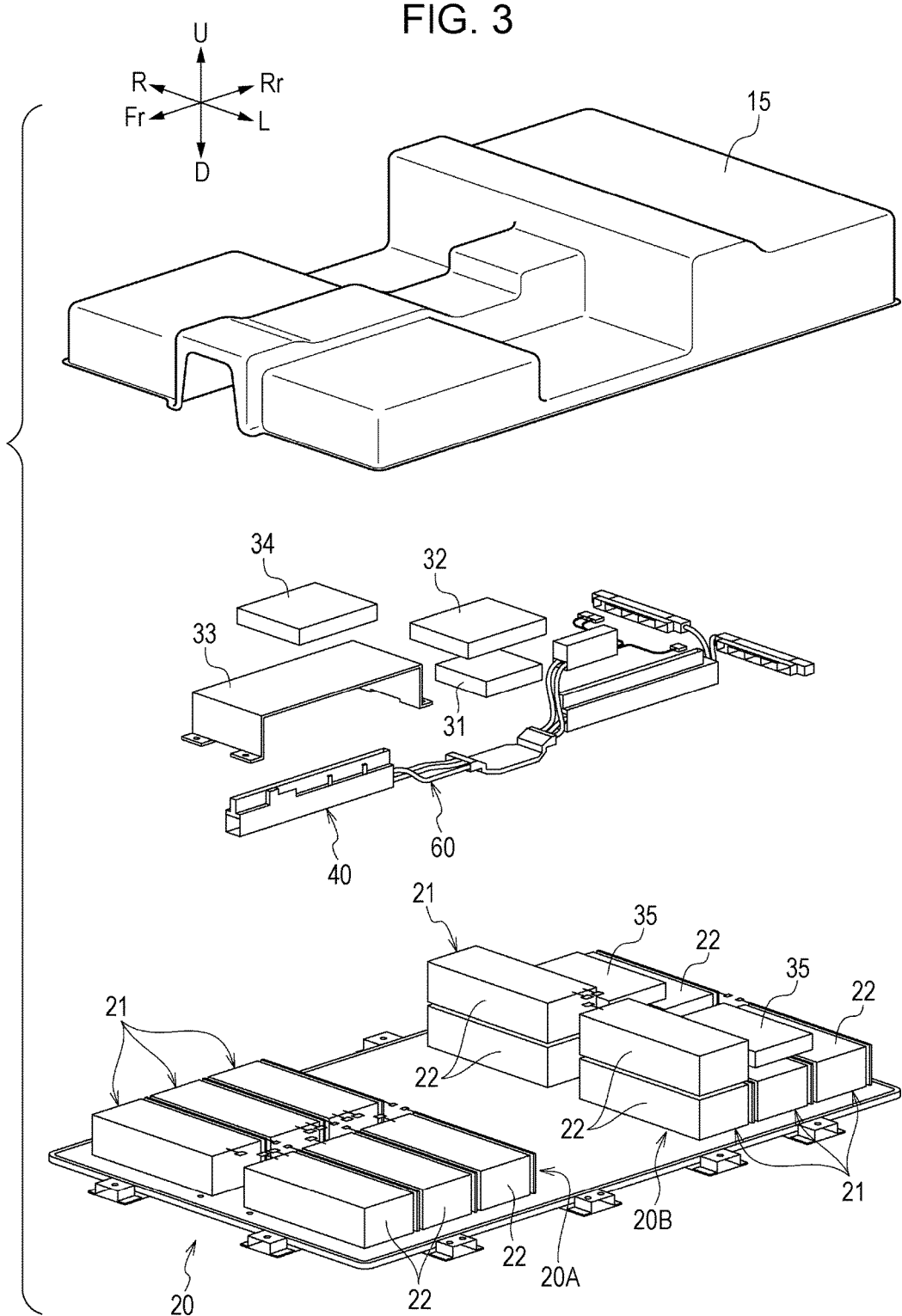
FIG. 3 is an exploded perspective view of a vehicle battery unit according to an embodiment.

FIG. 2 is a plan view showing an internal configuration of the vehicle battery unit 20. FIG. 3 is an exploded perspective view of the vehicle battery unit 20. As shown in FIGS. 2 and 3, the first battery module 20A and the second battery module 20B respectively include a plurality of battery pairs 21 disposed longitudinally. Each of the plurality of battery pairs 21 includes a pair of batteries 22 disposed in a lateral direction of the vehicle so as to be opposed to each other with a space G therebetween. The space G between a pair of the batteries 22 longitudinally extends through a line passing through the substantially breadthways center of the vehicle. The first battery module 20A shown in FIGS. 2 and 3 includes the three battery pairs 21 disposed longitudinally, while the second battery module 20B includes the three battery pairs 21 disposed longitudinally and the one battery pair 21 stacked on the battery pair 21 located at a front end.

The batteries 22 of the battery pairs 21 constituting the first battery module 20A and the second battery module 20B incorporate a voltage sensor (not illustrated) for detecting the voltage of the batteries 22. Voltage signal lines 23, each extending from the voltage sensor and having a battery connector 24A provided at an end thereof, go toward the space G from the batteries 22. Lead portions 23a through which the voltage signal lines 23 are led from the batteries 22 are offset to the vehicle front or rear from a longitudinal center line CL of the batteries 22. For any one of the battery pairs 21, a pair of the batteries 22 constituting each of the battery pairs 21 are opposed to each other in such a manner that the voltage signal lines 23 from the batteries 22 oppose each other with the space G therebetween, while the lead portions 23a through which the voltage signal lines 23 are led are offset to the vehicle front or rear from the center line CL so as to be face-to-face in the longitudinal direction of the vehicle.

For the plurality of battery pairs 21, the lead portions 23a through which the two voltage signal lines 23 are led from a pair of the batteries 22 constituting each of the battery pairs 21 are disposed face-to-face in the longitudinal direction of the vehicle in such a manner that the lead portions 23 from the battery pairs 21 that are adjacent to each other in the longitudinal direction are alternated between offset to the vehicle front and offset to the vehicle rear. For example, in one of the battery pairs 21 located at a front end of the first battery module 20A shown in FIG. 2, the lead portion 23a through which the voltage signal line 23 is led from one of the batteries 22 located on the right side is offset to the vehicle front, while the lead portion 23a through which the voltage signal line 23 is led from the other of the batteries 22 located on the left side is offset to the vehicle rear. In contrast, in one of the battery pairs 21 located in the middle of the first battery module 20A, the lead portion 23a through which the voltage signal line 23 is led from one of the batteries 22 located on the right side is offset to the vehicle rear, while the lead portion 23a through which the voltage signal line 23 is led from the other of the batteries 22 located on the left side is offset to the vehicle front. With this arrangement, a wrong connection with a harness 60 to be described later can be prevented.

Electric heaters 25 for keeping the batteries 22 warm are provided on the rear sides of the batteries 22. Heater cables 26 for supplying electric power to the electric heaters 25 extend toward the space G from the electric heaters 25. The heater cables 26 have a heater connector 27A provided at an end thereof. Either one of the batteries 22 constituting each of the battery pairs 21 incorporates a thermistor (not illustrated) for detecting the temperature of the batteries 22. Thermo-signal lines 28, each extending from a thermistor and having a thermo-connector 29A provided at an end thereof, go toward the space G from the batteries 22 incorporating the thermistors.

A harness holder 40 that houses a harness 60 therein is inserted into and disposed in the space G provided between a pair of the batteries 22 constituting each of the battery pairs 21. In other words, the harness holder 40 and the harness 60 are integrated into one body that is disposed in the space G in such a manner that its long side lies along the longitudinal direction of the vehicle.

Figure 4:
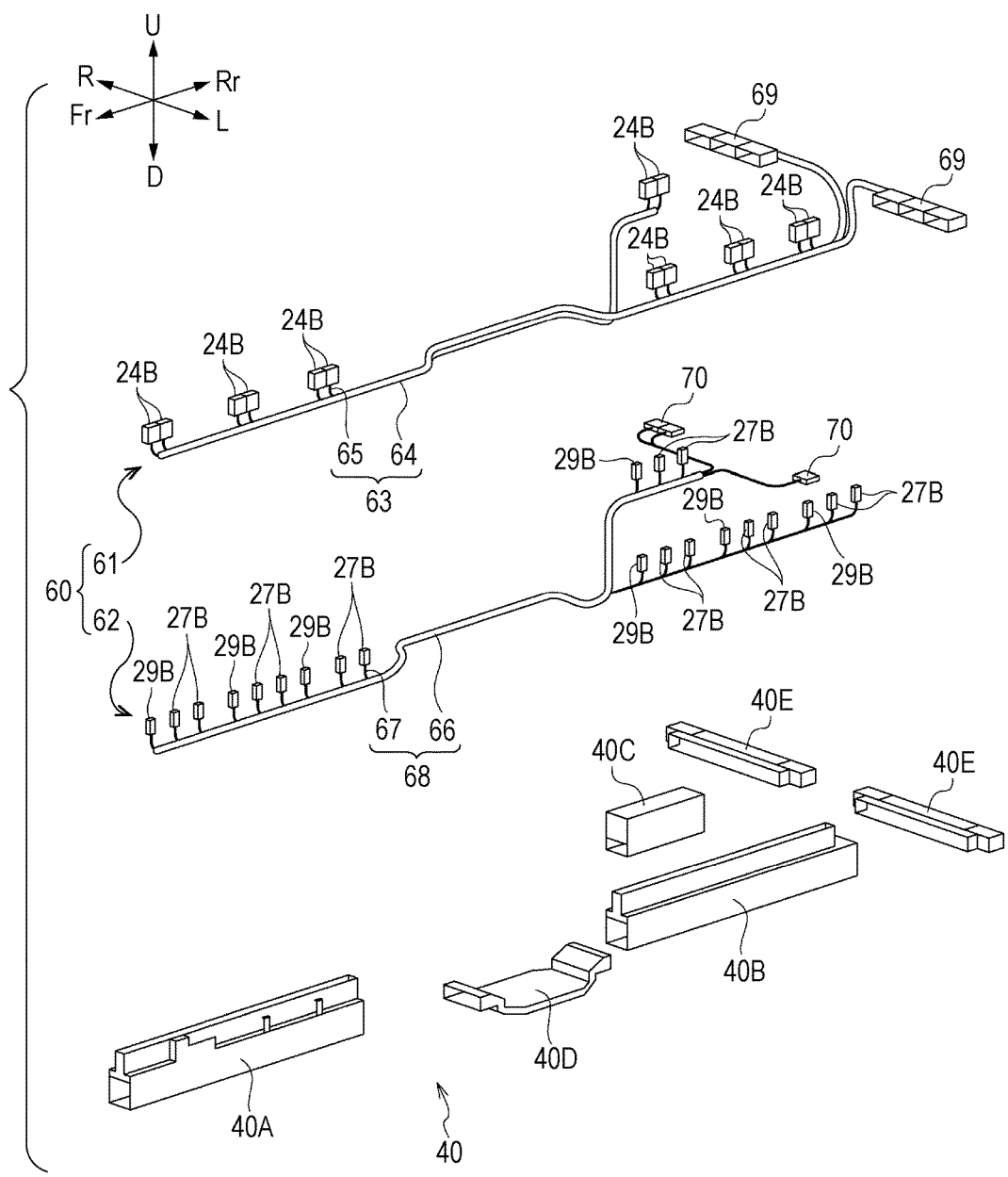
FIG. 4 is an exploded perspective view of a harness and a harness holder.

FIG. 4 is a exploded perspective view of the harness and the harness holder. As shown in FIG. 4, the harness 60 according to this embodiment includes a first harness 61 that transmits a signal for the voltage of the batteries 22 and a second harness 62 that supplies electric power to the electric heaters 25 and transmits a signal for the temperature of the batteries 22.

The first harness 61 includes a wire portion 63, which has a linear portion 64 extending in the longitudinal direction of the vehicle and a plurality of bent portions 65 extending at a right angle to the linear portion 64, and harness connectors 24B for battery voltage signals provided on ends of the plurality of bent portions 65. In addition, the first harness 61 bifurcates into left-side and right-side portions in a "T" shape at a rear end thereof, these portions being provided with a plurality of connectors 69 to be connected to a control unit 35 to be described later.

The second harness 62 includes a wire portion 68, which has a linear portion 66 extending in the longitudinal direction of the vehicle and a plurality of bent portions 67 extending at a right angle to the linear portion 66, and harness connectors 27B for the heaters and harness connectors 29B for battery temperature signals provided on ends of the plurality of bent portions 67. In addition, the second harness 62 bifurcates into left-side and right-side portions in a "T" shape at a rear end thereof, these portions being provided with a plurality of connectors 70 to be connected to a control unit 35 to be described later.

The harness holder 40 that houses the harness 60 consists of a first harness holder 40A corresponding to the first battery module 20A, a second harness holder 40B corresponding to the lower battery pair 21 in the second battery module 20B, and a third harness holder 40C corresponding to the upper battery pair 21 in the second battery module 20B. As shown in FIG. 4, the harness holder 40 may include a harness holder 40D, that is provided between the first harness holder 40A and the second harness holder 40B so as to house the wire portions of the first harness 61 and the second harness 62, and a connector holder 40E that stores the connectors 70 of the second harness 62.

Figure 5:
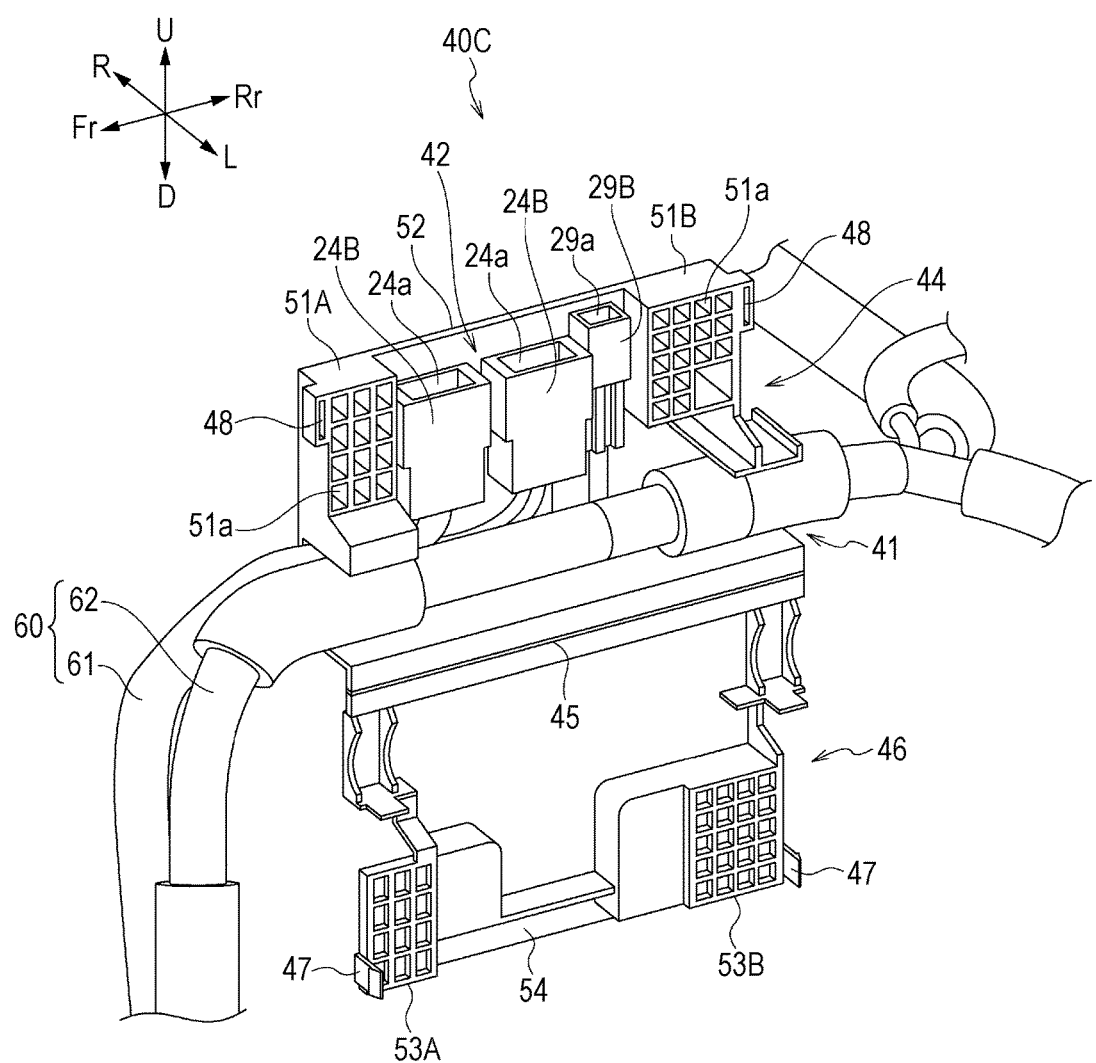
FIG. 5 is an exploded perspective view showing a state in which a lid of a third harness holder is opened.

The third harness holder 40C is described below with reference to FIG. 5. FIG. 5 is a perspective view showing a state in which a lid of the third harness holder 40C is opened. As shown in FIG. 5, the third harness holder 40C consists of a main unit 44 and a lid 46 to be connected to the main unit 44 via a thin-wall hinge 45 and has a harness housing portion 41 that houses the wire portions of the first harness 61 and the second harness 62 and a connector holding portion 42 that holds the harness connectors 24B, 29B that are connected to the battery connectors 24A and the thereto-connectors 29A, respectively. Locking pawls 47 provided on both ends of the lid 46 are engageable with/disengageable from locking portions 48 provided on both ends of the main unit 44.

Block portions 51A, 51B that are thick in a plate thickness direction and have high mechanical strength in a plate thickness direction are formed at both lengthwise-direction ends of a region in the main unit 44 where the connector holding portion 42 is formed. The block portions 51A, 51B have a plurality of rectangular spaces 51a formed in a plate thickness direction for weight saving. The block portions 51A, 51B are connected to each other through a plate-like coupling component 52. Presser plates 53A, 53B respectively corresponding to the block portions 51A, 51B are formed in a region in the lid 46 where the connector holding portion 42 is formed. The presser plates 53A, 53B are connected to each other through a coupling component 54.

The wire portions of the first harness 61 and the second harness 62 are inserted into the harness housing portion 41 in the third harness holder 40C when the lid 46 is opened. In addition, the harness connectors 24B, 29B are arranged in a line between the block portions 51A, 51B in such a manner that connection openings 24a, 29a to be connected to the battery connectors 24A and the thermo-connectors 29A face upward. When the lid 46 is rotated around the hinge 45, the presser plates 53A, 53B are brought into contact with the block portions 51A, 51B and the locking pawls 47 are engaged with the locking portions 48, thereby causing the main unit 44 and the lid 46 to be connected to each other.

The connector holding portion 42 in the third harness holder 40C in a state where the main unit 44 and the lid 46 are connected to each other has rectangular holes formed by the block portions 51A, 51B, the presser plates 53A, 53B, and the coupling components 52, 54, in which the harness connectors 24B, 29B are held with the connection openings 24a, 29a facing upward. The wire portions of the first harness 61 and the second harness 62 are housed in the tunnel-like harness housing portion 41 formed in the third harness holder 40C so as to lie in a lengthwise direction and are held in a plate thickness direction.

Figure 6:
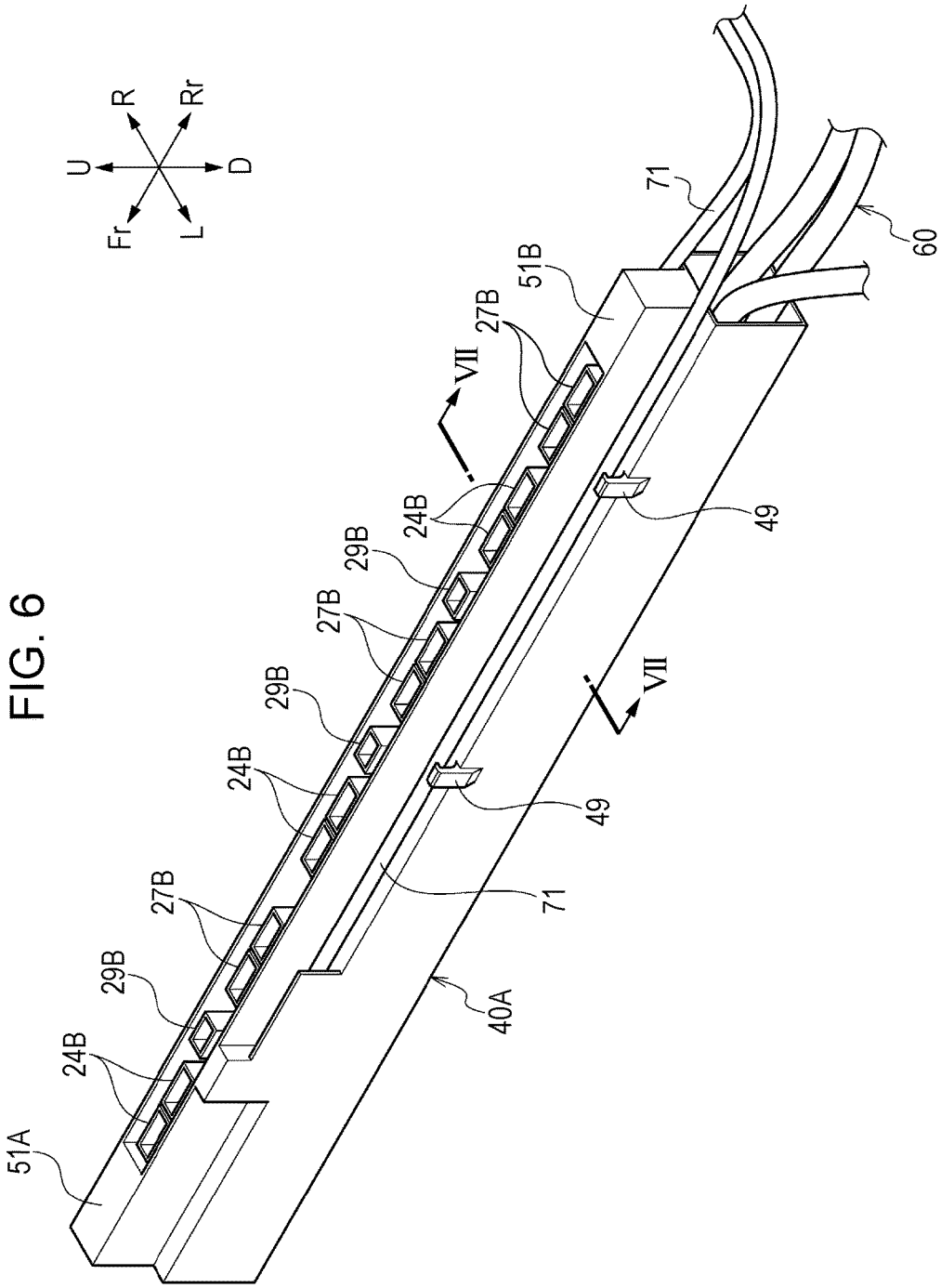
FIG. 6 is an expanded perspective view of a first harness holder.

Since the first harness holder 40A and the second harness holder 40B hold more connectors than the third harness holder 40C described above, they have different lengths in a lengthwise direction, but have the same basic structure as the third harness holder 40C. The first harness holder 40A is described below with reference to FIGS. 6 and 7. FIG. 6 is an expanded perspective view of the first harness holder 40A. FIG. 7 is a cross-sectional view taken along line VII-VII of FIG. 6.

As shown in FIG. 7, in the first harness holder 40A, the width W1 of the harness housing portion 41 is configured to be larger than the width W2 of the connector holding portion 42 and a cross section taken perpendicularly to the direction in which the harness housing portion 41 extends is configured to have a substantially convex shape. As a result, a step 55 is formed on the outside of a junction between the harness housing portion 41 and the connector holding portion 42.

The harness connectors 24B, 27B, 29B to which the battery connector 24A, the heater connector 27A, and the thermo-connector 29A are connected, respectively, are held by the connector holding portion 42 in the first harness holder 40A with the connection openings 24a, 27a, 29b facing upward. The harness connectors 24B, 27B, 29B in this state are held so as to be arranged in a line along a lengthwise direction of the first harness holder 40A.

As shown in FIGS. 6 and 7, a neutral point cable 71 to be connected to a neutral ground terminal (not illustrated) of the batteries 22 is routed on the step 55 in the first harness holder 40A along a lengthwise direction of the first harness holder 40A and is held by a locking piece 49. The direction in which the neutral point cable 71 is laid is substantially perpendicular to the direction of the bent portions constituting the wire portions of the first harness 61 and the second harness 62 housed in the first harness holder 40A. As described above, the neutral point cable 71 and the bent portions are perpendicular to each other and are spaced away from each other, thereby preventing the effect of electromagnetic noise from the neutral point cable 71 on the bent portions.

The first harness holder 40A in which the harness 60 is housed is inserted into and disposed in the space G provided between a pair of the batteries 22 of the first battery module 20A. Likewise, the second harness holder 40B in which the harness 60 is housed is inserted into and disposed in the space G provided between a pair of the batteries 22 under the second battery module 20B, while the third harness holder 40C in which the harness 60 is housed is inserted into and disposed in the space G provided between a pair of the batteries 22 above the second battery module 20B.

The battery connector 24A, the heater connector 27A, and the thermo-connector 29A extending from the batteries 22 in the first battery module 20A are respectively inserted from above into and connected to the harness connectors 24B, 27B, 29B held in the first harness holder 40A with the connection openings 24a, 27a, 29a facing upward.

Also, the battery connector 24A, the heater connector 27A, and the thermo-connector 29A extending from the batteries 22 provided below the first battery module 20B are respectively inserted from above into and connected to the harness connectors 24B, 27B, 29B held in the second harness holder 40B with the connection openings 24a, 27a, 29a facing upward.

Furthermore, the battery connector 24A and the thermo-connector 29A extending from the batteries 22 provided above the second battery module 20B are respectively inserted from above into and connected to the harness connectors 24B, 29B held in the third harness holder 40C with the connection openings 24a, 29a facing upward.

As described above, due to being arranged in a line along the lengthwise direction of the harness holder 40 with the connection openings facing upward, the harness connectors 24B, 27B, 29B of the harness 60 housed in the harness holder 40 can be easily connected to the battery connector 24A, the heater connector 27A, and the thermo-connector 29A, respectively. The harness connectors 24B, 27B, 29B are not necessarily arranged in a line, and may be relatively shifted to the direction in which the two batteries 22 disposed in the lateral direction of the vehicle are disposed.

As shown in FIG. 7, in a state in which the battery connector 24A, the heater connector 27A, and the thermo-connector 29A are respectively connected to the harness connectors 24B, 27B, 29B, the height H1 of an uppermost surface 24b of the battery connector 24A, the heater connector 27A, and the thermo-connector 29A is configured to be lower than the height H2 of an upper surface 22a of the batteries 22. This prevents any device mounted on a pair of the batteries 22 from interfering with the harness 60 over at least part of the harness holder 40 disposed in the space G.

As shown in FIGS. 1 through 3, in this embodiment, a pair of control units 35 are disposed in parallel on the lower, rearward two battery pairs 21 in the second battery module 20B. The control units 35 are connected to the batteries 22 through the harness 60 linearly extending in the longitudinal direction of the vehicle, thereby taking the shortest way to the first battery module 20A and the second battery module 20B.

In addition, as shown in FIGS. 1 through 3, a bracket 33 is provided over the first battery module 20A so as to be put over at least part of the first harness holder 40A in the longitudinal direction. A sub junction box (hereinafter referred to as "sub J/B") 34 having a fuse for cutting off the current from the batteries 22 is mounted on the bracket 33. With this arrangement, the sub J/B 34 can be disposed under a console box provided between two front seats constituting the front seat 12 of the vehicle, thereby making effective use of an interior space of the vehicle.

Furthermore, a DC-DC converter 31 and a main junction box (hereinafter referred to as "main J/B") 32 having a fuse for cutting off the current from the batteries 22 are stacked on the harness holder 40D located between the first battery module 20A and the second battery module 20B. A space between the first battery module 20A and the second battery module 20B in which the DC-DC converter 31 and the main J/B 32 are disposed corresponds to a location of the feet of passengers seated in the rear seats 13.

As described above, the vehicle battery unit 20 and the harness holder 40 according to this embodiment enable the battery connector 24A to be easily connected to the harness connectors 24B of the harness 60 housed in the harness holder 40 since the harness connectors 24B have their connection openings 24a facing upward. In addition, the harness holder 40 having the harness 60 housed therein is disposed between the two batteries 22, whereby possible damage to the harness can be prevented even when the vehicle is subjected to a side impact. Furthermore, since the harness holder 40 plays a role of a cushion when the vehicle is subjected to a side impact, the batteries 22 do not come into contact with each other, thereby protecting the batteries 22. As described above, protection of the vehicle battery unit 20 from a vehicle side impact can be improved.

The two harness connectors 24B are disposed so as to be perpendicular to the vertical direction and the direction in which the two batteries 22 are disposed, whereby the space G between the batteries 22 can be narrowed. In addition, due to the connection openings 24a of the harness connectors 24B facing upward, the battery connectors 24A and the harness connectors 24B can be easily connected to each other.

The uppermost surface 24b of the battery connectors 24A connected to the harness connector 24B is configured to be lower than the upper surface 22a of the batteries 22, whereby the height of the vehicle battery unit 20 can be reduced to downsize the vehicle battery unit 20. In addition, the battery connectors 24A can be prevented from interfering with the sub J/B 34 and the control unit 35 mounted on the batteries 22.

The harness holder 40 has the step 55 formed by the harness housing portion 41 that houses the wire portions 63, 68 of the harness 60 and the connector holding portion 42 that holds the harness connectors 24B, 27B, 29B, and the neutral point cable 71 is disposed on the step 55, whereby the step 55 can be effectively used as a space for disposing the neutral point cable 71 in addition to the harness 60, enabling the vehicle battery unit 20 to be downsized.

The wire portions 63, 68 of the harness 60 are held in the harness housing portion 41 from the direction in which the two batteries 22 are disposed. For this reason, if the wire portions 63, 68 of the harness 60 are not held as desired in the harness housing portion 41, the harness housing portion 41 is swelled in the direction in which the two batteries 22 are disposed, making it impossible for the harness holder 40 to fit into the space G between the batteries 22. It can be determined from failure of the harness holder 40 to correctly fit into the space G that the wire portions 63, 68 of the harness 60 are not held as desired, thereby avoiding the failure of the harness holder 40 to completely fit into the space G resulting from the harness 60 that is not housed as desired.

The wire portion 63 of the first harness 61 has the linear portion 64 extending along the harness holder 40 and bent portions 65 extending at a right angle to the linear portion 64 toward the harness connectors 24B, 29B. The bent portions 65 are substantially perpendicular to the neutral point cable 71 disposed on the step 55, which can suppress the effect of electromagnetic noise from the neutral point cable 71 on the bent portions 65.

The harness holder 40 has the block portions 51A, 51B having the plurality of spaces 51a formed so as to have higher stiffness in the direction in which the two batteries 22 are disposed, thereby making the harness holder 40 lightweight and preventing possible damage to the harness 60 resulting from a vehicle side impact. In addition, the block portions 51A, 51B are formed in the harness holder 40 in an integrated manner, whereby the effect described above can be produced at good space efficiency without using additional components.

The harness connectors 27B, 29B respectively connected to the heater connector 27A extending from the electric heater 25 and the thermo-connector 29A extending from the thermistor (not illustrated) are held by the harness holder 40 in such a manner that the connection openings 27a, 29a are perpendicular to the direction in which the two batteries 22 are disposed. In addition, the harness connectors 27B, 29B respectively correspond in position to the heater connector 27A and the thermo-connector 29A, whereby the heater cables 26 extending from the electric heaters 25 to the heater connectors 27A and the thermo-signal lines 28 extending from the thermistors to the thermo-connectors 29A can be minimized. Consequently, the electric heaters 25 and the thermistors can be connected to the heater connectors 27A and the thermo-connectors 29A, respectively, in an efficient manner at low cost.

The lead portions 23a through which the voltage signal lines 23 of the battery connectors 24A are led from the batteries 22 are offset along a direction perpendicular to the vertical direction and the direction in which the two batteries 22 are disposed, whereby the voltage signal lines 23 extending from the batteries 22 to the battery connectors 24A can be minimized. As a result, the batteries 22 and the battery connectors 24A are connected to each in an efficient manner at low cost.

The plurality of battery pairs 21 are disposed so as to be perpendicular to the vertical direction and the direction in which the two batteries 22 are disposed. With this arrangement, a relatively slim vehicle battery unit can be applied to high-power electrically driven vehicles in need of large-capacity batteries.

In addition, the bracket 33 is provided so as to cover the space G over the at least part of the harness holder 40 and has the sub J/B 34 provided thereon, whereby the exposure of connections of the battery connectors 24A, the heater connectors 27A, and the thermo-connectors 29A with the harness connectors 24B, 27B, 29B to the outside can be avoided.

Furthermore, the first battery module 20A is disposed under the front seats 12 and the sub J/B 34 is disposed between the two front seats 12, whereby the sub J/B 34 can be disposed under the console box to make effective use of an interior space of the vehicle.

The present application is typically described with reference to, but not limited to, the foregoing embodiment. Various modifications are conceivable within the scope of the present application.

A first aspect of the embodiment provides a vehicle battery unit (for example, vehicle battery unit 20 in an embodiment to be described later) which includes at least one battery pair (for example, battery pair 21 in the embodiment) having two batteries (for example, batteries 22 in the embodiment), each having a battery connector (for example, battery connector 24A in the embodiment), disposed so as to be opposed to each other with a space (for example, space G in the embodiment) therebetween, in which a harness (for example, harness 60 in the embodiment) having two harness connectors (for example, harness connectors 24B in the embodiment) connected to the battery connectors and being housed in a harness holder (for example, harness holder 40 in the embodiment) is disposed in the space, and in which the harness holder holds the harness in such a manner that connecting portions (for example, connection openings 24a in the embodiment) of the two harness connectors face a direction perpendicular to a direction (for example, lateral direction of the vehicle in the embodiment) in which the two batteries are disposed. With this arrangement, the battery connector can be easily connected to the harness connectors. In addition, the harness holder having the harness housed therein is disposed between the two batteries, whereby possible damage to the harness can be prevented even when the vehicle is subjected to a side impact. Furthermore, since the harness holder plays a role of a cushion even when the vehicle is subjected to a side impact, the batteries do not come into contact with each other, thereby protecting the batteries. As described above, protection of the vehicle battery unit from a vehicle side impact can be improved.

A second aspect of the embodiment provides the vehicle battery unit of the first aspect, in which the two harness connectors may be disposed along a direction (for example, longitudinal direction of the vehicle) perpendicular to the battery disposition direction and the vertical direction and the connecting portions of the two harness connectors are disposed so as to face upward. With this arrangement, the space between the batteries can be narrowed. In addition, the battery connectors and the harness connectors can be easily connected to each other.

A third aspect of the embodiment provides the vehicle battery unit of the first aspect, in which an uppermost surface (for example, uppermost surface 24b in the embodiment) of the battery connectors connected to the harness connectors may be lower than an upper surface (for example, upper surface 22a in the embodiment) of the batteries. With this arrangement, the height of the vehicle battery unit can be reduced to downsize the vehicle battery unit. In addition, the battery connectors can be prevented from interfering with the ancillary devices mounted on the batteries.

A fourth aspect of the embodiment provides the vehicle battery unit of the first aspect, in which the harness holder may include a housing portion (for example, harness housing portion 41 in the embodiment) that houses a wire portion (for example, wire portion 63 in the embodiment) of the harness and a holding portion (for example, connector holding portion 42 in the embodiment) that holds the harness connectors, and a step (for example, step 55 in the embodiment) resulting from a difference between width (width W1) of the housing portion and width (width W2) of the holding portion in the battery disposition direction, and in which a cable (for example, neutral point cable 71 in the embodiment) may be disposed on the step. With this arrangement, the step can be effectively used as a space for disposing another cable in addition to the harness, enabling the vehicle battery unit to be downsized.

A fifth aspect of the embodiment provides the vehicle battery unit of the fourth aspect, in which the wire portion may be held from the battery disposition direction in the housing portion. With this arrangement, if the wire portions of the harness are not held as desired in the harness housing portion, the harness housing portion is swelled in the direction in which the two batteries are disposed, making it impossible for the harness holder to fit into the space between the batteries. It can be determined from the fact of failure of the harness holder to correctly fit into the space that the wire portions of the harness are not held as desired, thereby avoiding the failure of the harness holder to completely fit into the space resulting from the harness that is not housed as desired.

A sixth aspect of the embodiment provides the vehicle battery unit of the fourth aspect, in which the wire portion may have a linear portion (for example, linear portion 64) extending along the harness holder and a bent portion (for example, bent portions 65) extending at an angle to the linear portion, and in which the bent portion may be substantially perpendicular to the cable. With this arrangement, the effect of electromagnetic noise from the neutral point cable on the bent portions can be suppressed.

A seventh aspect of the embodiment provides the vehicle battery unit of the first aspect, in which the two harness connectors may be disposed along a direction perpendicular to the battery disposition direction and the vertical direction, and in which the harness holder may have block portions (for example, block portions 51A, 51B in the embodiment) having a plurality of spaces (for example, spaces 51a in the embodiment) formed therein in such a manner that stiffness in the battery disposition direction is higher than stiffness in a direction perpendicular to the battery disposition direction and the vertical direction. With this arrangement, the harness holder can be made lightweight and possible damage to the harness resulting from a vehicle side impact can be prevented. In addition, the block portions are formed in the harness holder in an integrated manner, whereby possible damage to the harness can be prevented at good space efficiency without using additional components.

An eighth aspect of the embodiment provides the vehicle battery unit of the first aspect, in which at least one of the two batteries may have ancillary devices (for example, electric heater 25 and thermistor), in which the harness holder may house another harness (for example, second harness 62 in the embodiment) having another harness connectors (for example, harness connectors 27B, 29B in the embodiment) connected to ancillary device connectors (for example, heater connector 27A and thermo-connector 29A in the embodiment) extending from the ancillary devices in such a manner that connecting portions (for example, connection openings 27a, 29a) of the another harness connectors face a direction perpendicular to the battery disposition direction, and in which the another harness connectors correspond to the ancillary device connectors in position in a direction perpendicular to the battery disposition direction and the vertical direction. With this arrangement, a cable extending from the ancillary devices to the ancillary device connectors can be minimized. Consequently, the ancillary devices and the ancillary device connectors can be connected to each other in an efficient manner at low cost.

A ninth aspect of the embodiment provides the vehicle battery unit of the second aspect, in which lead portions (for example, lead portions 23a from the batteries 22 in the embodiment) through which signal lines (for example, voltage signal lines 23 in the embodiment) of the two battery connectors are led from the batteries may be offset in a direction perpendicular to the battery disposition direction and the vertical direction. With this arrangement, signal lines extending from the batteries to the battery connectors can be minimized. As a result, the batteries and the battery connectors can be connected to each other in an efficient manner at low cost.

A tenth aspect of the embodiment provides the vehicle battery unit of the first aspect, in which the plurality of battery pairs may be disposed in a direction perpendicular to the battery disposition direction and the vertical direction. With this arrangement, a relatively slim vehicle battery unit can be applied to high-power electrically driven vehicles in need of large-capacity batteries.

An eleventh aspect of the embodiment provides the vehicle battery unit of the first aspect, in which a cover plate (for example, bracket 33 in the embodiment) may be provided over the space so as to be put over at least part of the harness holder and in which a device (for example, sub junction box 34 in the embodiment) may be mounted on the cover plate. The cover plate prevents exposure of connections between the battery connectors and the harness connectors.

A twelfth aspect of the embodiment provides the vehicle battery unit of the eleventh aspect, which may include a first battery module (for example, first battery module 20A in the embodiment) consisting of the plurality of battery pairs and a second battery module (for example, second battery module 20B in the embodiment) consisting of the plurality of battery pairs, in which the first battery module may be disposed under a front seat (for example, front seat 12 in the embodiment) and the device is disposed between two seats constituting the front seat. With this arrangement, an interior space of the vehicle can be effectively used.

A thirteenth aspect of the embodiment provides a harness holder (for example, harness holder 40 in the embodiment) that houses a harness (for example, harness 60 in the embodiment in the embodiment) disposed between two batteries (for example, batteries 22 in the embodiment) that are disposed so as to be opposed to each other with a space (for example, space G in the embodiment) therebetween, in which the harness is held in such a manner that connecting portions (for example, connection openings 24a) of two harness connectors (for example, harness connectors 24B in the embodiment) connected to battery connectors (for example, battery connectors 24A in the embodiment) extending from the two batteries face a direction perpendicular to a direction in which the two batteries are disposed.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle battery unit comprising:
   at least one battery pair having two batteries, each battery having an end with a battery connector, the two batteries being disposed so that the ends oppose each other in a battery disposition direction with a space sandwiched between the ends of the two batteries in the battery disposition direction,
   wherein a harness holder is disposed in the space sandwiched between the ends of the two batteries, and a harness having two harness connectors connected to the battery connectors is housed in the harness holder,
   wherein an uppermost surface of the battery connectors connected to the harness connectors is lower than an upper surface of the batteries; and
   wherein the harness holder holds the harness in such a manner that connection openings of the two harness connectors face in a direction perpendicular to the battery disposition direction in which the two batteries are disposed to oppose each other.

2. The vehicle battery unit according to claim 1,
   wherein the two harness connectors are disposed along a direction perpendicular to the battery disposition direction and a vertical direction; and
   wherein the connection openings of the two harness connectors are disposed so as to face upward.

3. The vehicle battery unit according to claim 1,
   wherein the two harness connectors may be disposed along a direction perpendicular to the battery disposition direction and the vertical direction; and
   wherein the harness holder has block portions having a plurality of spaces formed therein in such a manner that stiffness in the battery disposition direction is higher than stiffness in a direction perpendicular to the battery disposition direction and the vertical direction.

4. The vehicle battery unit according to claim 1,
   wherein at least one of the two batteries has ancillary devices;
   wherein the harness holder houses another harness having other harness connectors connected to ancillary device connectors extending from the ancillary devices in such a manner that connection openings of the other harness connectors face a direction perpendicular to the battery disposition direction; and
   wherein the another harness connectors correspond to the ancillary device connectors in position in a direction perpendicular to the battery disposition direction and the vertical direction.

5. The vehicle battery unit according to claim 2,
   wherein lead portions through which signal lines of the two battery connectors are led from the batteries are offset in a direction perpendicular to the battery disposition direction and the vertical direction.

6. The vehicle battery unit according to claim 1,
   wherein the plurality of battery pairs are disposed in a direction perpendicular to the battery disposition direction and the vertical direction.

7. The vehicle battery unit according to claim 1,
   wherein a cover plate is provided over the space so as to be put over at least part of the harness holder; and
   wherein a device is mounted on the cover plate.

8. The vehicle battery unit according to claim 7, further comprising:
   a first battery module consisting of the plurality of battery pairs; and
   a second battery module consisting of the plurality of battery pairs,
   wherein the first battery module is disposed under a front seat and the device is disposed between two seats constituting the front seat.

9. A vehicle battery unit comprising:
at least one battery pair having two batteries, each having a battery connector, disposed so as to oppose each other in a battery disposition direction with a space therebetween,
wherein a harness holder is disposed in the space, and a harness having two harness connectors connected to the battery connectors is housed in the harness holder;
wherein the harness holder holds the harness in such a manner that connecting portions of the two harness connectors face a direction perpendicular to the battery disposition direction in which the two batteries are disposed to oppose each other;
wherein the harness holder includes a housing portion that houses a wire portion of the harness, a holding portion that holds the harness connectors, and a step resulting from a difference between a width of the housing portion and a width of the holding portion in the battery disposition direction; and
wherein a cable is disposed on the step.

10. The vehicle battery unit according to claim 9,
wherein the wire portion is held from the battery disposition direction in the housing portion.

11. The vehicle battery unit according to claim 9,
wherein the wire portion has a linear portion extending along the harness holder and a bent portion extending at an angle to the linear portion; and
wherein the bent portion is substantially perpendicular to the cable.

12. A vehicle battery unit comprising:
at least one first battery having a first end with a first battery connector;
at least one second battery having a second end with a second battery connector, the second end being disposed opposite to the first end in a battery arranging direction with a space sandwiched between the first end and second end in the battery arranging direction; and
a harness provided in a harness holder and having harness connectors connected to the first battery connector and second battery connector, wherein an uppermost surface of the first battery connector and second battery connector connected to the harness connectors is lower than upper surfaces of the at least one first battery and the at least one second battery, the harness holder being disposed in the space sandwiched between the first end and the second end, and the harness holder holding the harness such that connection openings of the harness connectors face in a direction substantially perpendicular to the battery arranging direction in which the at least one first battery and the at least one second battery are arranged.

13. The vehicle battery unit according to claim 12,
wherein the harness connectors are disposed along a direction substantially perpendicular to the battery arranging direction and a vertical direction; and
wherein the connection openings of the harness connectors are disposed so as to be directed upward.

14. The vehicle battery unit according to claim 12,
wherein the harness connectors are disposed along a direction substantially perpendicular to the battery arranging direction and the vertical direction; and
wherein the harness holder has block portions having a plurality of spaces formed therein in such a manner that stiffness in the battery arranging direction is higher than stiffness in a direction substantially perpendicular to the battery arranging direction and the vertical direction.

15. The vehicle battery unit according to claim 12,
wherein at least one of the at least one first battery and the at least one second battery has an ancillary device;
wherein the harness holder houses another harness having other harness connector connected to an ancillary device connector extending from the ancillary device in such a manner that a connection opening of the other harness connector are directed toward a direction substantially perpendicular to the battery arranging direction; and
wherein the another harness connector corresponds to the ancillary device connector in position in a direction substantially perpendicular to the battery arranging direction and the vertical direction.

16. The vehicle battery unit according to claim 13,
wherein lead portions through which signal lines of the battery connectors are led from the at least one first battery and the at least one second battery are offset in a direction substantially perpendicular to the battery arranging direction and the vertical direction.

17. The vehicle battery unit according to claim 12,
wherein the at least one first battery includes a plurality of first batteries,
wherein the at least one second battery includes a plurality of second batteries, and
wherein the plurality of first batteries and the plurality of second batteries are arranged in a direction substantially perpendicular to the battery arranging direction and the vertical direction.

18. The vehicle battery unit according to claim 12,
wherein a cover plate is provided over the space so as to be put over at least part of the harness holder; and
wherein a device is mounted on the cover plate.

19. The vehicle battery unit according to claim 18,
wherein the at least one first battery includes a plurality of first batteries,
wherein the at least one second battery includes a plurality of second batteries,
wherein the vehicle battery unit further comprises a battery module including the plurality of first batteries and the plurality of second batteries,
wherein the first battery module is disposed under a front seat including two seats, and
wherein the device is disposed between two seats.

20. A vehicle battery unit comprising:
at least one first battery having a first battery connector;
at least one second battery having a second battery connector and disposed opposite to the at least one first battery in a battery arranging direction with a space therebetween; and
a harness provided in a harness holder and having harness connectors connected to the first battery connector and second battery connector, the harness holder being disposed in the space and holding the harness such that connecting portions of the harness connectors face in a direction substantially perpendicular to the battery arranging direction in which the at least one first battery and the at least one second battery are arranged,
wherein the harness holder includes:
a housing portion that houses a wire portion of the harness;
a holding portion that holds the harness connectors; and
a step resulting from a difference between a width of the housing portion and a width of the holding portion in the battery arranging direction; and
wherein a cable is disposed on the step.

21. The vehicle battery unit according to claim 20, wherein the wire portion is held from the battery arranging direction in the housing portion.

22. The vehicle battery unit according to claim 20, wherein the wire portion has a linear portion extending along the harness holder and a bent portion extending at an angle to the linear portion; and wherein the bent portion is substantially perpendicular to the cable.

* * * * *